July 23, 1935.  A. J. HOLMAN  2,008,714

GEAR TRAIN FOR MOVING PICTURE PROJECTORS

Original Filed Sept. 10, 1923   3 Sheets-Sheet 1

Inventor
Arthur J. Holman
by Franklin F. Phillips
his Attorney

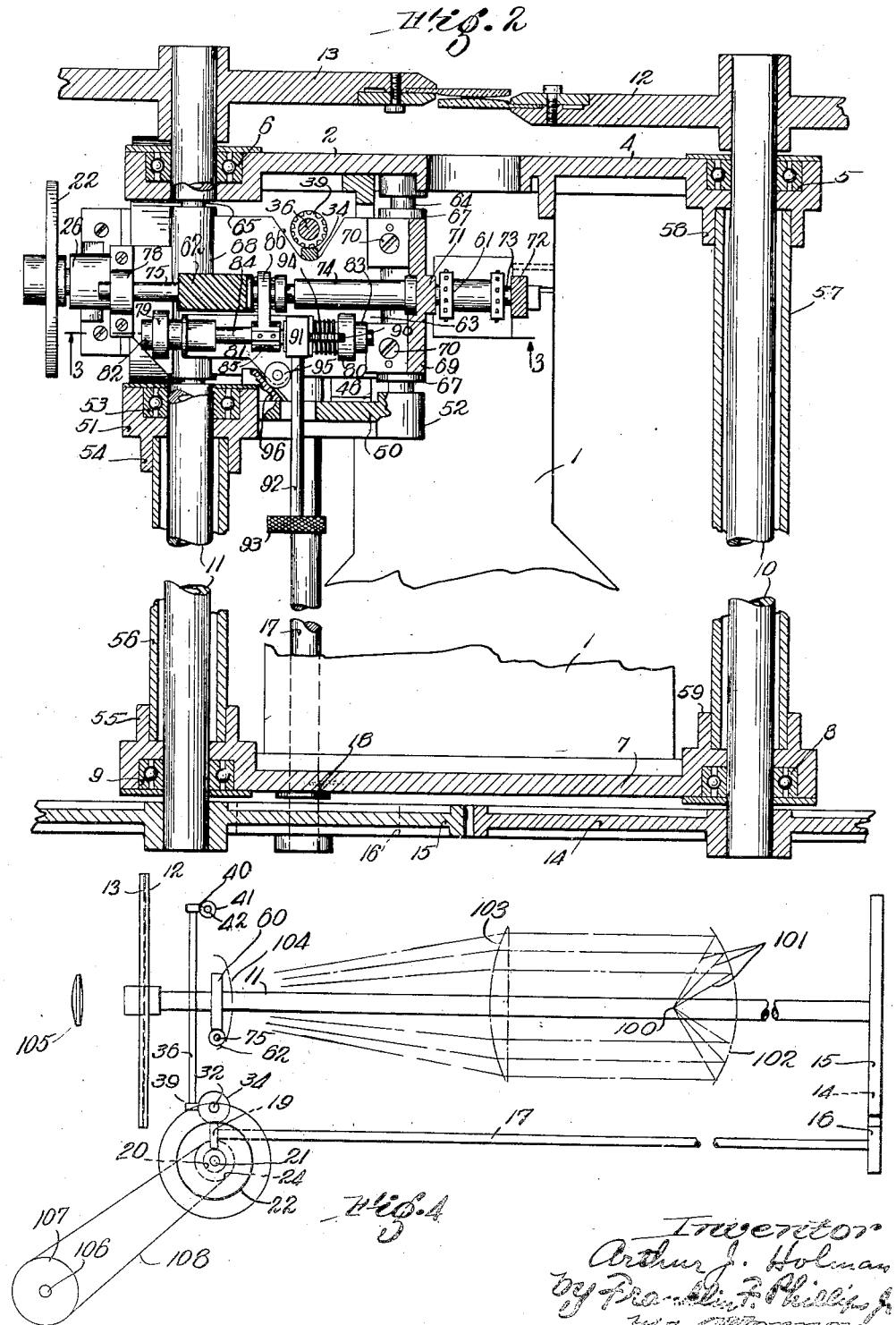

July 23, 1935. A. J. HOLMAN 2,008,714
GEAR TRAIN FOR MOVING PICTURE PROJECTORS
Original Filed Sept. 10, 1928 3 Sheets-Sheet 3
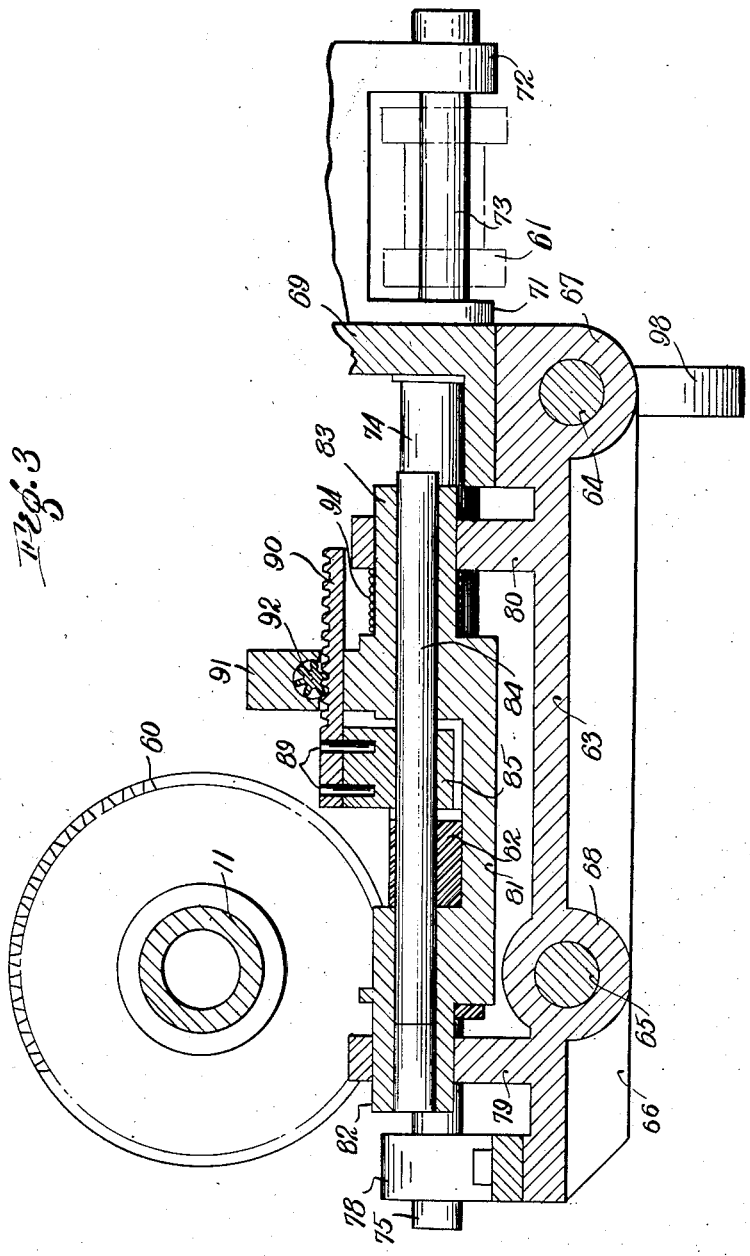

Patented July 23, 1935

2,008,714

UNITED STATES PATENT OFFICE 2,008,714

GEAR TRAIN FOR MOVING PICTURE PROJECTORS

Arthur J. Holman, East Orange, N. J.

Application September 10, 1928, Serial No. 304,977
Renewed October 24, 1934

11 Claims. (Cl. 88—16.8)

My device combines a gear train for synchronizing the movement of the film strip and the optical rectifying means in a projector of the type shown in my Patent No. 1,584,098 dated May 11, 1926. The special objects of my invention have been to reduce the total number of gears heretofore employed in a projector of this type thereby simplifying the gear system; to reduce the number of gears between the film sprocket which actuates the film strip across the aperture plate and the revolving optical rectifying elements thereby making the synchronization of film movement and movement of optical rectifying elements less subject to errors arising from imperfections in the intermediate gear train; to so arrange and time the gear train that no gear shaft in the projector operates at a speed greatly in excess of the speed of the sprocket shaft thereby reducing vibration and noise to a minimum; also it has been my further object to provide an improved and simplified means for accomplishing the relative temporary hastening or retarding of the rotation of the film sprocket with respect to the revolving optical system to permit framing of the picture on the screen and to permit adjustment of the aperture unit along the optical axis to compensate for film shrinkage.

My device may be best understood by reference to the accompanying drawings in which Fig. 1 is a view of a projector taken substantially on the plane of the film sprockets looking forward, with a part of the framing means removed and with the peripheries of the optical rectifying means shown in broken lines.

Fig. 2 is a plan view of a section taken on the optical axis with the shaft which carries the left optical rectifying means cut away together with the gear mounted thereon; the aperture unit being sectioned at a plane below the optical axis so as to disclose the aperture sprocket.

Fig. 3 is a section on line 3—3 of Fig. 2 illustrating the movable mounting of the aperture sprocket adjusting parts.

Fig. 4 is a diagrammatic side view showing the relative location of all gears and shafts with respect to the light source, aperture and optical elements.

Figure 1:
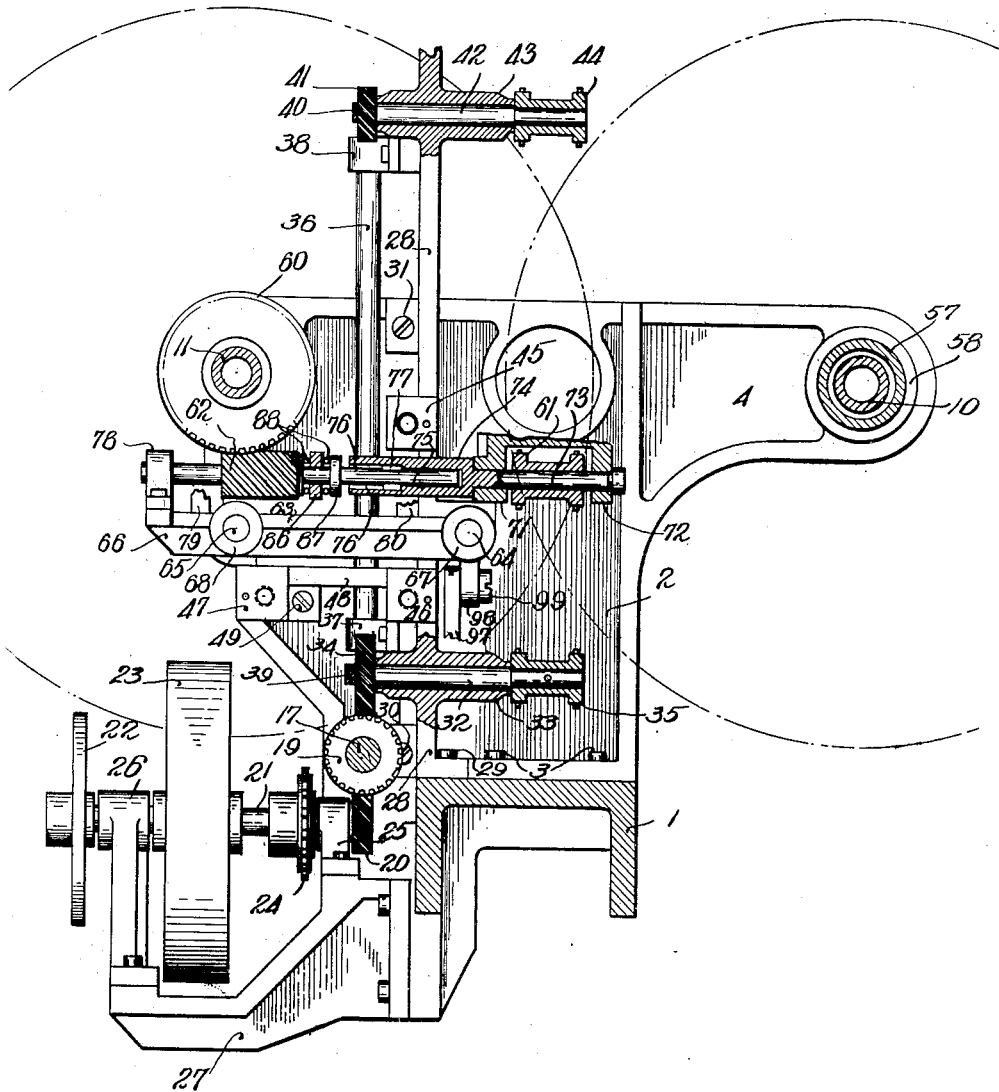

Referring now more specifically to the drawings, 1 is the main frame which carries the front frame 2 secured to the main frame 1 by the screws 3. The front frame 2 has an integral bracket 4 in which is mounted the ball bearing 5 (Fig. 2). A similar ball bearing 6 is mounted in the upper left part of the frame 2.

A rear vertical frame 7 (Fig. 2) is suitably mounted on the rear of the main frame 1. This frame 7 carries the ball bearings 8 and 9. Lens wheel shafts 10 and 11 are mounted respectively in the ball bearings 8 and 5 and 9 and 6, and carry respectively lens wheels 12 and 13 on their front ends and gears 14 and 15 on their rear ends. Gears 14 and 15 are in mesh.

The gear 16 meshes with gear 15 and is mounted on the rear end of shaft 17 which is journaled in a boss 18 on the lower portion of the back frame 7. The shaft 17 (Fig. 1) carries thereon the helical gear 19 which meshes with gear 20 on the power shaft 21 which receives power from a suitable source through the friction disc 22. A fly wheel 23 is fast mounted on the power shaft 21 as is also the sprocket 24 which is used for actuating the lower magazine take-up means. The power shaft 21 is journaled in brackets 25 and 26 which are mounted on bracket 27 attached to the main frame 1.

A sprocket bearing frame 28 is secured to the main frame 1 by screw 29 and to the front frame 2 by screws 30 and 31. The lower sprocket shaft 32 is journaled in boss 33 integral with the sprocket frame 28 and carries fast mounted on its rear end helical gear 34 which meshes with helical gear 19 on the shaft 17. The sprocket 35 is fast mounted on the front end of the sprocket shaft 32.

A vertical shaft 36 journaled in brackets 37 and 38 attached to the sprocket bearing frame 28 carries fast mounted on its lower end the helical gear 39 which meshes with the helical gear 34 on the lower sprocket shaft 32. Fast mounted on the upper end of vertical shaft 36 is a helical gear 40 which meshes with a helical gear 41 fast mounted on the rear end of upper sprocket shaft 42. This shaft 42 is journaled in boss 43 on the top of sprocket bearing frame 28 and carries fast mounted on its outer end the upper sprocket 44.

Sprocket bearing frame 28 has integral pads 45 and 46.

In the same plane with pads 45 and 46 is a pad 47 which is integral with the angular bracket 48 fastened to the front frame 2 by the screw 49. Attached to these pads 45, 46 and 47 is a frame 50 (Fig. 2) which carries integral lugs 51 and 52. The lug 51 carries the ball bearing 53 in which is journaled the lens wheel shaft 11. Within annular lug 54 on the frame 50 and annular lug 55 on the rear frame 7, are fixed respectively the front and rear ends of a tubular member 56. A similar tubular member 57 is fixed within annular lugs 58 and 59 on the bracket 4 and the rear frame 7 respectively. These tubular members 56 and 57 serve to brace the structure and to shield the lens wheel shafts 11 and 10 respectively.

The lens wheel shaft 11 carries fast thereon a helical gear 60 (Fig. 1) for actuating the aperture sprocket 61 through the helical gear 62 by the means now to be described.

An axially adjustable carriage 63 is slidably mounted upon rods 64 and 65 which are fixed at their forward ends in the front frame 2 and at their rear ends in the frame 50. The carriage 63 is stiffened by the web 66 and carries annular bosses 67 and 68 which provide sliding bearings through which pass the rods 64 and 65 respectively.

The aperture frame 69 (Fig. 2) is secured to the carriage 63 by the screws 70. The aperture frame 69 has integral bosses 71 and 72 in which is journaled the aperture sprocket shaft 73 on which is fast mounted the aperture sprocket 61. The sprocket shaft 73 has an enlarged portion 74 (Fig. 1) which is bored to admit the shaft 75 with a free sliding fit. The bore of the enlarged portion 74 is provided with key ways 76 in which engage the keys 77 which are integral with the shaft 75 and prevent any angular displacement of the shaft 75 with respect to the aperture sprocket shaft 73. The other end of the shaft 75 is journaled in the bearing bracket 78 which is secured to the sliding carriage 63.

The shaft 75 carries the helical gear 62 fast thereon which gear meshes with the helical gear 60 on the lens wheel shaft 11.

To actuate the shaft 75 longitudinally in either direction, I provide the following described mechanism:

The sliding carriage 63 has integral lugs 79 and 80 (Fig. 3) within which is slidably mounted the frame 81 which bears integral circular bosses 82 and 83 which enter bores in lugs 79 and 80 respectively, and slide freely therein. The circular bosses 82 and 83 are bored to receive the ends of the shaft 84 which is slidably mounted therein. Fast mounted on the shaft 84 is a sleeve 85 which is provided with an integral arm 86 (Fig. 2) which is bored to fit around the shaft 75 between a collar 87 and the gear 62 (Fig. 1). Thrust ball bearings 88 are provided on either side of the arm 86.

The sleeve 85 has attached to the top thereof by pins 89, (Fig. 3) the rack bar 90 which may slide through an opening in the lug 91 on frame 81. A pinion shaft 92 mounted to fit tightly, yet rotatably, in the lug 91 engages the rack bar 90 and is provided with a hand wheel 93 (Fig. 2). A coil spring 94 (Fig. 3) surrounding the circular boss 83 abuts at one end against the lug 80 and at the other end against the lug 91 on the frame 81, thus actuating the frame 81 to the left so as to maintain the engagement of the roller 95 (Fig. 2) mounted on frame 81 with the guide track 96 on frame 50. The guide track 96 runs at an angle to the shaft 75 equal to the angle of the teeth on the helical gear 62.

To adjust the position of the carriage 63 along the optical axis a lever 97 (Fig. 1) is provided. The lever 97 is attached at the end above its fulcrum to the lug 98 which is integral with boss 67 on the carriage 63 by the pivot screw 99. Axial adjustability of the carriage 63, is necessitated by the requirement that the apparatus be quickly adjustable for variations in film shrinkage. The effect variable film shrinkage has on the correct axial positioning of the aperture frame 69, which is secured to the carriage 63, is fully described in Letters Patent of the United States No. 1,857,152.

The operation of my device is as follows:

Power is applied to the shaft 21 through the friction disc 22 and thence through the gear 20 to the gear 19 and shaft 17. The lower sprocket shaft 32 is driven from the gear 19 through the gear 34 which also drives the vertical shaft 36 through the gear 39. The top sprocket shaft 42 is driven from the vertical shaft 36 through the gears 40 and 41.

Power to rotate the shafts 10 and 11 in opposite directions is applied by gear 16 which is fast on the shaft 17, the gear 16 transmitting the power from shaft 17 to the shaft 11 through the gear 15, which, through gear 14, transmits driving power to the shaft 10. It is to be noted that the relative rotation of shafts 10 and 11 affects the relative movement of the revolving lens wheels 12 and 13 and synchronization of these rotatable optical rectifying elements is dependent merely upon the accuracy of the gears 14 and 15.

To actuate the aperture sprocket 61 and provide for relative movement of the film strip with respect to the rotatable lens wheels, or optical rectifying elements, for the purpose of "framing," and to permit the axial adjustment of the position of the aperture unit (film shrinkage adjustment) without disturbance to "framing," power is applied to the aperture sprocket shaft 73 in the following manner:

The helical gear 60 fast mounted on the shaft 11 meshes with the long faced helical gear 62 which is fast mounted on the shaft 75 which is adjustable longitudinally, and it will be readily apparent that its movement longitudinally will have the effect of either hastening or retarding the rotation of its shaft 75 and will thus have the effect of either hastening or retarding the aperture sprocket shaft 73 which is directly driven by the shaft 75 through the keys 77.

This longitudinal adjustment of the gear 62 is effected by turning the hand wheel 93 so as to move to the right or left the rack 90 to which is connected the arm 86 which embraces the shaft 75 and fixes its longitudinal position.

It will be readily understood that if the position of the aperture frame 69 is shifted axially by movement of its carriage 63 upon the rods 64 and 65 there will result a movement of the helical gear 62 across the face of the helical gear 60 which would result in alteration of the framing adjustment unless compensated by a longitudinal movement of the gear 62. The relative transverse and longitudinal movement of the gear 62 is determined by the helical angle of the teeth of this gear. As the carriage 63 is moved forward or back by the manipulation of the lever 97 to adjust the apparatus for variations in film shrinkage, the frame 81, which is slidably mounted in bosses 79 and 80 on the carriage 63, is permitted a movement at right angles to the movement imparted to the carriage 63. This movement of the frame 81 is automatically regulated by the contact of the roller 95 with guide track 96 which is aligned at the same angle with respect to the optical axis as that of the teeth on the helical gear 62. The constant bearing of the roller 95 on the guide track 96 is maintained in every position by the pressure of the coil spring 94 which forces the frame 81 to the left. The pinion shaft 92 is frictionally retained in the boss 91 to an extent such that no rotation thereof is possible except by substantial torque being applied to the hand wheel 93.

In Fig. 4 of the drawings is shown a diagrammatic side view of my gear train in association with a light source of the reflector type, the light source being located at 100 so that the light rays 101 impinge upon the reflector 102 and are reflected forward through the condenser 103, which converges the light beam through the optical system after passing the aperture plate position indicated by the curved broken line 104, whence it finally passes through the objective 105. Thus it will be seen that my improved gear train embraces the lamp house, and permits a direct drive between the revolving lens wheel shafts without interference with the light beam. In this diagrammatic view shown in Fig. 4 are also indicated the lower magazine shaft 106 and the sprocket 107 for actuating the film take-up reel through the medium of sprocket chain 108, which is driven by the sprocket 24, which has been previously described.

From the foregoing, it will be readily apparent that there are many advantages in the above-described structure as compared with that disclosed in my said Patent No. 1,584,098. As the gear train is employed in a situation such that it is important to eliminate vibration and wear as much as possible, and also important to minimize as much as possible the results of slight imperfections in the gear teeth, the gear train above described is especially adapted for service under the conditions for which it is designed to be used. The synchronized elements, including the two revolving lens wheels and the aperture sprocket, are driven as a unit from a shaft which has been made practically free from speed pulsations. The revolving lens wheels are driven directly, the one from the other, through a single pair of gears and one rolling gear contact; any error, therefore, in the synchronization of these lens wheels is due to an inaccuracy of the manufacture of the two gears only. There is no chance for cumulative error to creep in. Since these gears are identical, the manufacturing problem has been reduced to a minimum, as only one kind of precision gear is required to obtain exact synchronization of the revolving lens wheels.

The drive from one revolving lens wheel shaft to the aperture sprocket is provided through a single pair of helical gears which are inherently smooth running and quiet. Any error in synchronizing the movement of the film strip with the rotation of one of the revolving lens wheels is due to the inaccuracy of two gears only, whereas, in the design shown in my said patent, there were seven gears in the train from a lens wheel to the aperture sprocket and thus the opportunities for error were multiplied.

The means provided to "frame" the picture on the screen and at the same time, permit movement of the aperture unit along the optical axis for "shrink and focus" adjustment without disturbance to the framing, have been greatly simplified as compared with the means shown in my said patent.

It will be readily understood that the lens wheel shafts need not be extended beyond the back of the light source, so that their driving gears will not intercept the light beam, if a reflection system is used to divert the beam of light around the gears which would otherwise interfere with it. As reflection, however, involves a loss of light, it is preferable to employ the construction shown.

The simplicity and cheapness of my improved structure is apparent.

Having thus fully described my invention, what I claim is:

1. In a moving picture device employing overlapping rotatable rectifying elements, the combination of a power shaft, a gear fast mounted thereon, a second gear meshing with said gear fast mounted on said power shaft, a second shaft to one end of which said second gear is attached, a third gear attached to the opposite end of said second shaft, a pair of parallel shafts carrying upon one end of each an optical rectifying element, and a pair of similar gears each of which is fast mounted upon one of said parallel shafts on the end thereof opposite to said end upon which said optical rectifying element may be mounted, which similar gears mesh with each other and one of which gears meshes with said third gear.

2. In a moving picture device employing overlapping rotatable rectifying elements, the combination of a pair of parallel shafts adapted to carry a pair of optical rectifying elements on their forward ends, and a pair of similar gears, said gears being fast mounted on the rearward ends of said parallel shafts, and arranged to mesh with each other, the point of contact of the pitch circles of said gears being on the optical axis and behind the light source substantially as and for the purpose specified.

3. In a moving picture device employing overlapping rotatable rectifying elements, the combination of a pair of parallel shafts carrying a pair of optical rectifying elements, a pair of similar gears fast mounted on said pair of parallel shafts and arranged to mesh with each other, a third gear fast mounted on one of said parallel shafts, a fourth gear arranged to be driven by said third gear, a third shaft rotatably and slidably mounted for adjustment axially and having fast mounted thereon said fourth gear, an aperture film sprocket, means for driving said sprocket from said third shaft, means for moving said third shaft and said film sprocket in a direction parallel to said parallel shafts, and means for moving simultaneously said third shaft in an axial direction to prevent change in relative angular velocity of said third and fourth gears as said film sprocket is thus moved.

4. In a device of the character specified, the combination of a pair of parallel shafts carrying a pair of optical rectifying elements, a pair of similar gears fast mounted on said pair of parallel shafts and arranged to mesh with each other, a third gear fast mounted on one of said parallel shafts, a fourth gear arranged to be driven by said third gear, a third shaft rotatably and slidably mounted for adjustment axially and having fast mounted thereon said fourth gear, an aperture film sprocket, means for driving said sprocket from said third shaft, and means for moving said third shaft in an axial direction.

5. In a device of the character specified, the combination of a pair of parallel shafts carrying a pair of optical rectifying elements, a pair of similar gears fast mounted on said pair of parallel shafts and arranged to mesh with each other, a third gear fast mounted on one of said parallel shafts, a fourth gear arranged to be driven by said third gear, a third shaft rotatably and slidably mounted for adjustment axially and having fast mounted thereon said fourth gear, an aperture film sprocket, means for driving said sprocket from said third shaft, means for moving said third shaft and said film sprocket in a direction parallel to said parallel shafts, means for moving simultaneously said third shaft in an axial direction to prevent change in angular velocity of said sprocket as said sprocket is moved, and means for moving manually said third shaft in an axial direction.

6. In a moving picture projector, the combination of a pair of parallel shafts carrying a pair of optical rectifying elements, a pair of similar gears fast mounted on said pair of parallel shafts and arranged to mesh with each other, a third gear fast mounted on one of said parallel shafts, a slidably mounted carriage arranged to be adjustable in a direction parallel to said parallel shafts, a third shaft rotatably and slidably mounted on said carriage, a fourth gear fast mounted on said third shaft and arranged to mesh with and be driven by said third gear, an aperture film sprocket rotatably mounted on said carriage in alignment with said third shaft and adapted to be driven thereby, means for maintaining driving engagement between said third shaft and said sprocket, and means for preventing change in angular velocity of said sprocket as said carriage is adjusted with respect to said rectifying elements.

7. In a gear train for a moving picture projector, the combination of two helical gears adapted and arranged to mesh continuously with their axes at right angles, the first gear being mounted to rotate in a fixed position, adjustable means for mounting the second gear, said means being slidable in a direction parallel to the axis of said first gear, and means adapted and arranged automatically to variously position said second gear along its axis thereby preventing relative change in angular velocity of said gears as said second gear is moved along the axis of said first gear.

8. In a gear train, the combination of two helical gears adapted and arranged to mesh continuously with their axes at an angle, slidable means for mounting said gears so that one may move both axially and tangentially with respect to the other, and means whereby the resultant of said combined movements may be directed parallel to the teeth of said gears at their point of contact thereby preventing change in relative angular velocity of gears as said movements take place.

9. In a moving picture projector employing overlapping rotatable rectifying elements, the combination of an aperture film sprocket, a shaft whereon said film sprocket is fast mounted, a pair of helical gears mounted at an angle to each other and arranged to mesh continuously, said gears being adapted and arranged to drive said sprocket, means whereby one of said gears is mounted slidably in two directions so that it may be displaced both transversely and tangentially with respect to the other of said gears, and means for maintaining such proportionate displacements that there is no change in angular velocity of said aperture sprocket.

10. In a moving picture projector employing overlapping rotatable rectifying elements, the combination of a two gear direct drive between shafts whereon said rectifying elements are mounted, a two gear direct drive between one of said shafts and the aperture feed sprocket of said projector, and means whereby the position of said aperture feed sprocket may be adjusted with respect to said rectifying elements without causing momentary change in angular velocity of said feed sprocket.

11. In a moving picture projector employing overlapping rotatable rectifying elements, the combination of a two gear direct drive between shafts whereon said rectifying elements are mounted, a two gear direct drive between one of said shafts and the aperture feed sprocket of said projector, means whereby the position of said aperture feed sprocket may be adjusted with respect to said rectifying elements without causing momentary change in angular velocity of said sprocket, and manual means for providing momentary acceleration and retardation of said sprocket.

ARTHUR J. HOLMAN.